(12) United States Patent
Yokotani et al.

(10) Patent No.: US 6,874,592 B2
(45) Date of Patent: Apr. 5, 2005

(54) ELECTRICALLY ASSISTED BICYCLE

(75) Inventors: Kazunobu Yokotani, Hirakata (JP); Hideaki Aoki, Kyoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/695,761

(22) Filed: Oct. 30, 2003

(65) Prior Publication Data
US 2004/0084238 A1 May 6, 2004

(30) Foreign Application Priority Data
Oct. 30, 2002 (JP) ......................................... 2002-316794

(51) Int. Cl.[7] .............................................. B62K 11/00
(52) U.S. Cl. ........................ 180/205; 180/206; 180/65.1
(58) Field of Search ..................... 180/6.5, 65.1–65.5, 180/219, 220, 205–207; 318/139

(56) References Cited

U.S. PATENT DOCUMENTS

| | | | | |
|---|---|---|---|---|
| 3,841,428 A | * | 10/1974 | Bialek | 180/65.2 |
| 3,921,741 A | * | 11/1975 | Garfinkle et al. | 180/205 |
| 3,921,745 A | * | 11/1975 | McCulloch et al. | 180/205 |
| 4,221,275 A | * | 9/1980 | Pennebaker et al. | 180/206 |
| 5,237,263 A | * | 8/1993 | Gannon | 323/288 |
| 5,316,101 A | * | 5/1994 | Gannon | 180/221 |
| 5,777,442 A | * | 7/1998 | Miyata | 318/2 |
| 6,155,369 A | * | 12/2000 | Whittaker | 180/220 |
| 6,320,336 B1 | * | 11/2001 | Eguchi | 318/139 |
| 6,446,745 B1 | * | 9/2002 | Lee et al. | 180/206 |

FOREIGN PATENT DOCUMENTS

JP 2001-30974 2/2001

* cited by examiner

*Primary Examiner*—Lesley D. Morris
*Assistant Examiner*—L. Lum
(74) *Attorney, Agent, or Firm*—Burns, Doane, Swecker & Mathis, L.L.P.

(57) ABSTRACT

An electrically assisted bicycle includes a human power drive mechanism for transmitting human power from a pedal to a rear wheel, a motor drive mechanism for auxiliarily driving a front wheel or the rear wheel by a motor, a battery for supplying the motor with electric power, a brake lever operated by a driver, a brake mechanism for braking the front or rear wheel that is not driven by the motor drive mechanism, by human power transmitted from the brake lever, and a motor control circuit for controlling the motor so that the motor is regeneratively braked to act as a power generator when the brake lever is operated.

5 Claims, 10 Drawing Sheets

ELECTRICALLY ASSISTED BICYCLE

BACKGROUND OF THE INVENTION

1. Field of the Invention

The present invention relates to an electrically assisted bicycle. Particularly the invention relates to regenerative braking of a motor as a drive source for driving a wheel of the electrically assisted bicycle.

2. Description of the Background Art

Electrically assisted bicycles are generally provided with a motor drive mechanism for auxiliarily driving a rear wheel by a motor and also have a power source section including a battery and the like for supplying the motor with electric power.

The electrically assisted bicycle disclosed in Japanese laid-open patent No. 2001-30974 is an example of the electrically assisted bicycles, which is provided with a motor for auxiliarily driving a rear wheel, a condenser for supplying the motor with a driving current, a brake lever operated by a driver on the bicycle, a brake mechanism for braking the rear wheel by human power transmitted from the brake lever, and a control circuit (electric circuit). When the brake lever is operated, the control circuit closes a circuit for supplying the motor with the driving current from the condenser and applies a regenerative current to the motor. Thereby the motor is regeneratively braked to act as a power generator, and the rear wheel is braked. The control circuit further switches circuits so that the power generated by the motor is stored in the condenser.

In the above-described conventional example, when the brake lever is operated, braking by the brake mechanism works at the same time as braking by the regenerative braking of the motor. For this reason, the rear wheel is abruptly braked, and therefore, the bicycle does not run stably.

SUMMARY OF THE INVENTION

The present invention is intended to solve the above-mentioned problems, and an object thereof is to avoid the unstable running of a bicycle attributed the abrupt braking of the rear wheel by the operation of the brake lever.

The present invention provides an electrically assisted bicycle including a human power drive mechanism for transmitting human power from a pedal to a rear wheel; a motor drive mechanism for auxiliarily driving a front wheel or the rear wheel by a motor; a battery for supplying the motor with electric power; a brake lever operated by a driver; a brake mechanism for braking, by human power transmitted from the brake lever, the front or rear wheel that is not driven by the motor drive mechanism; and a motor control circuit for controlling the motor so that the motor is regeneratively braked to act as a power generator when the brake lever is operated.

The motor drive mechanism may be constituted to auxiliarily drive the front wheel.

The brake mechanism may be constituted to brake the front or rear wheel by the human power transmitted from the brake lever when a displacement amount of the brake lever is larger than a predetermined value.

The electrically assisted bicycle may further include a display device for indicating a remaining capacity of the battery when the brake lever is not operated.

The electrically assisted bicycle may further include an operation section for switching auxiliary driving power by the motor on the front or rear wheel between high and low.

The electrically assisted bicycle may further include a display section for indicating that the motor auxiliary driving the front or rear wheel is regeneratively braked.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENT

Figure 1A:
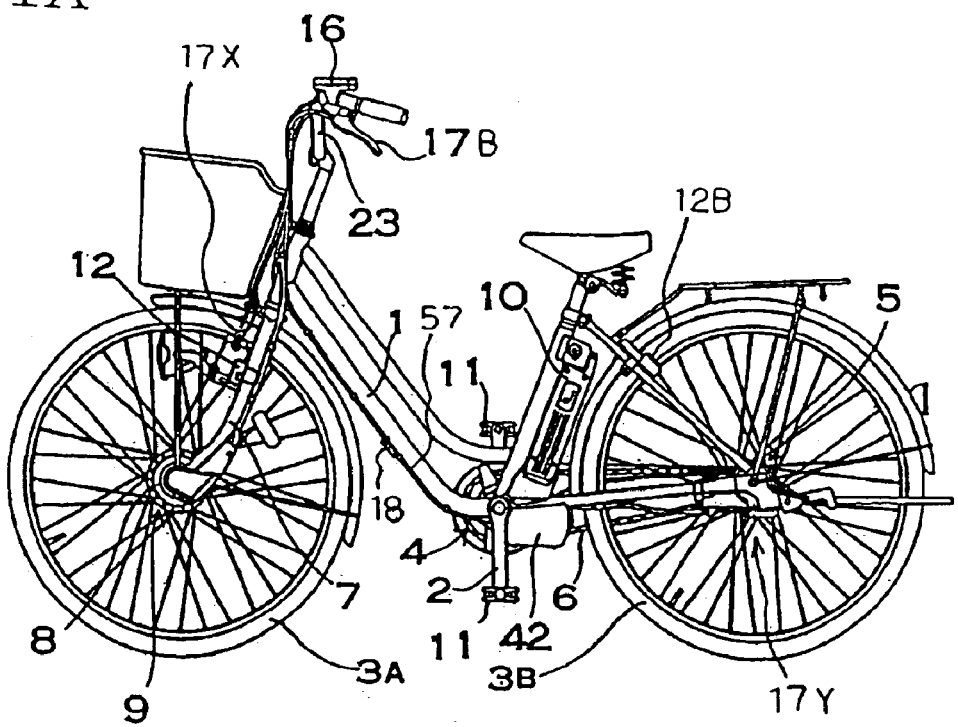
FIG. 1A is a side view of an electrically assisting bicycle in accordance with an example of the present invention, showing a side view of the whole bicycle.

An electrically assisted bicycle shown in FIG. 1A has a frame 1 and a human power drive mechanism. The human power drive mechanism includes a pedal crank 2 to which pedals 11 are attached, the pedal crank 2 being mounted on a lower end of the frame 1, a first sprocket 4 rotated by the pedal crank 2 and a rear wheel 3B rotated by the pedal crank 2 via a chain 6. The human power drive mechanism transmits human driving power from the pedals 11 to the rear wheel 3B.

The electrically assisted bicycle also has a front wheel 3A mounted on a lower end of a front fork 7 and a motor drive mechanism. The motor drive mechanism includes a motor 9 built in a front hub 8 of the front wheel 3A for driving the front wheel 3A and a battery 10 for supplying electric power to the motor 9. The motor drive mechanism drives the front wheel 3A using the motor 9 as a drive source. A control box 42 containing therein a control circuit 15 as described later is mounted on the lower end of the frame 1.

Figure 2:
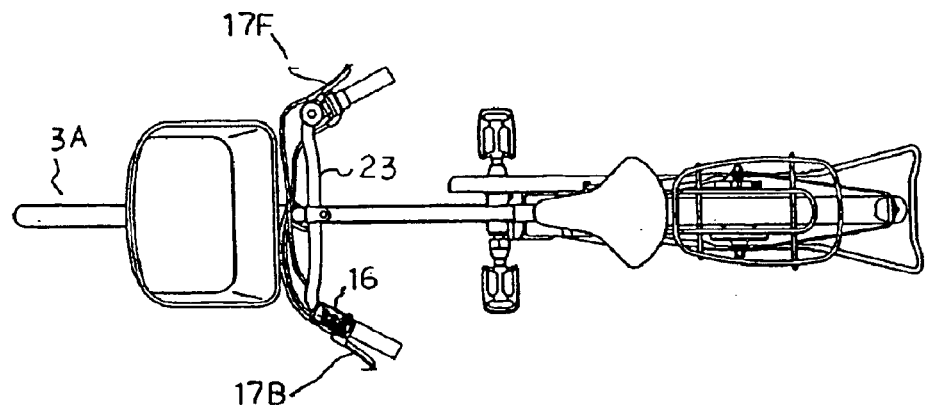
FIG. 2 is a top view of the electrically assisting bicycle.

As shown in FIG. 2, a rear brake lever 17B operated by an driver is mounted on the left of a handle bar 23 and a front brake lever 17F operated by the driver is mounted on the right of the handle bar 23 like ordinary (non-electrically-assisted) bicycles. A side brake 17X is mounted on the front fork 7 as a brake mechanism for braking the front wheel 3A by pressing a brake shoe against a rim of the front wheel 3A. The side brake 17X is actuated by gripping the front brake lever 17F and thereby pulling an inner brake cable. A drum brake 17Y is mounted at the center of the rear wheel 3B as a brake mechanism for braking the rear wheel 3B.

Figure 1B:
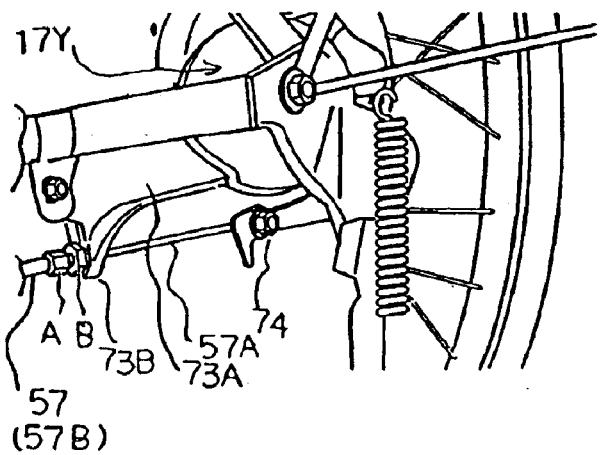
FIG. 1B is a partially enlarged view of a rear section of the electrically assisting bicycle (with a kickstand in an upright position)
Figure 3:
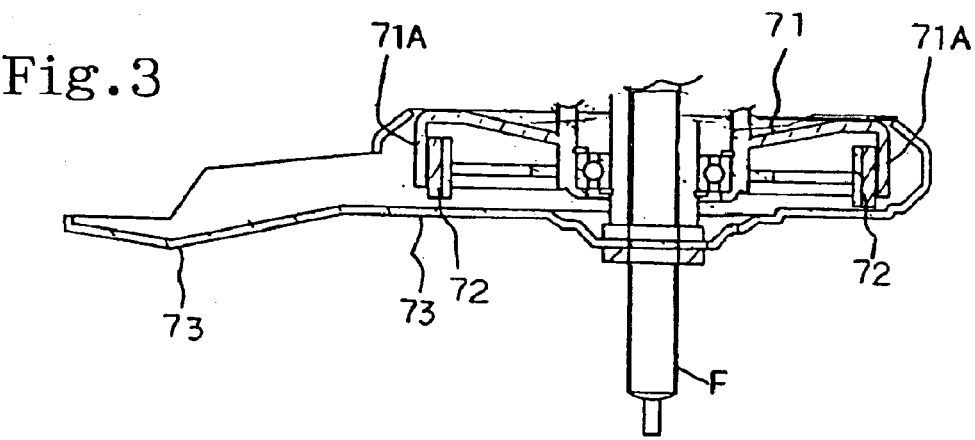
FIG. 3 is a sectional view of a major part of a drum brake of the electrically assisting bicycle.

The drum brake 17Y has a known structure and, as shown in FIG. 3 illustrating its major part in section, includes a disk brake drum 71 having a ring section 71A mounted rotatably with the rear wheel 3B about a fixed axle F fixed to the frame 1. The brake drum 71 contains therein a brake shoe 72 which brakes the rotation of the brake drum 71 (i.e., the rotation of the rear wheel 3B) by slidingly abutting outward, that is, slidingly abutting to the inside periphery of the ring section 71A of the brake drum 71 when the rear brake lever 17B is operated. The outside of the drum brake 17Y is covered with a brake holder 73, from which an arm 73A is extended forward for firm fixation (see FIG. 1B). A fixing portion 73B for fixing an outer tube 57b of a rear brake cable 57 is provided adjacently to the arm 73A. An inner cable 57a of the rear brake cable 57 is fixed to a connection member 74, which is connected to an extending bar (not shown) for operating the brake show 72. As shown in FIG. 1B, the fixing portion 73B includes an adjusting screw A and a nut B for adjusting the length of the rear brake cable 57 as known. With the above-described structure, when the rear brake lever 17B is gripped, the inner cable 57a of rear brake cable 57 is pulled, and the connection member 74 is displaced. By the displacement of the connection member 74, the brake shoe 72 is actuated via the extending bar (not shown) to brake the rear wheel 3B.

In the electrically assisted bicycle, when the pedals 11 are stepped, the pedal crank 2 rotates the first sprocket 4, which in turn rotates the rear wheel 3B via the chain 6 and the second sprocket 5. When the pedal crank 2 thus drives the rear wheel 3B, torque by human power is detected and the motor 9 in the front hub 8 is supplied with power from the battery 10 to drive the front wheel 3A auxiliarily. In the electrically assisted bicycle, the power supplied to the motor 9 is so controlled that the running torque of the motor 9 for driving the front wheel is equal to the running torque of the pedal crank 2 for driving the rear wheel 3B so long as the traveling velocity is smaller than a predetermined velocity. When the traveling reaches the predetermined velocity, the motor 9 does not drive the wheel 3A.

In the electrically assisted bicycle, a key 12 is provided at the front wheel 3A. The key 12 stops the rotation of the front wheel 3A reliably when it is locked. Therefore, when the key 12 is locked, the front wheel 3A does not rotate even if the motor drives the front wheel 3A due to malfunction, mis-operation or the like. Further, in this example, a rear wheel key 12B is also provided for locking the rear wheel 3B.

Figure 4:
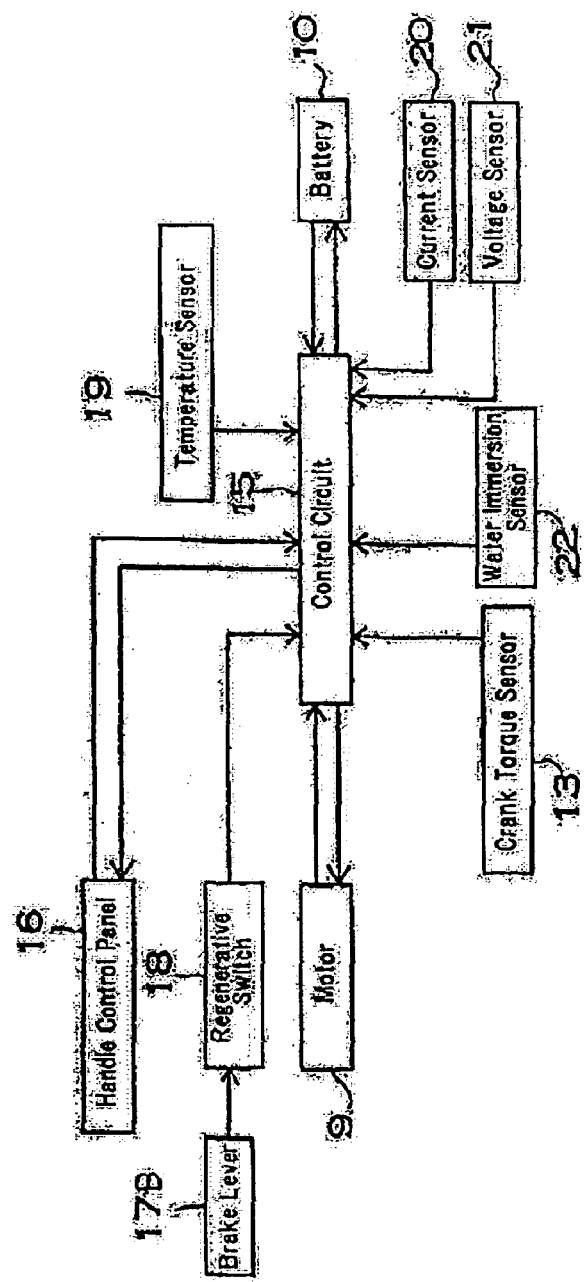
FIG. 4 is a block diagram of a motor control circuit for driving a motor of the electrically assisted bicycle.

FIG. 4 is a block diagram of a motor control circuit mounted on the electrically assisted bicycle of FIG. 1A for supplying power to the motor 9 with the battery 10. The motor control circuit of the electrically assisted bicycle shown in this block diagram inclues a crank torque sensor 13 for detecting a driving torque by a stepping power on the pedals 11 which causes the wheel 3B to drive, the motor 9 for driving the wheel 3A, the battery 10 for supplying power to the motor 9 and a control circuit 15 connected between the motor 9 and the battery 10 for controlling the power supplied to the motor 9 by the battery 10.

The control circuit 15 of the motor control circuit is connected to a handle control panel 16 for switching the traveling state of the electrically assisted bicycle, a regenerative switch 18 associated with the operation of the rear brake lever 17B which switch detects the operation of the rear brake lever 17B and determines the timing of regenerative braking, a temperature sensor 19 for detecting the temperature of circuit components and others used in the control circuit 15 and a current sensor 20 and a voltage sensor 21 for detecting the current and voltage of the battery 10.

Figure 5:
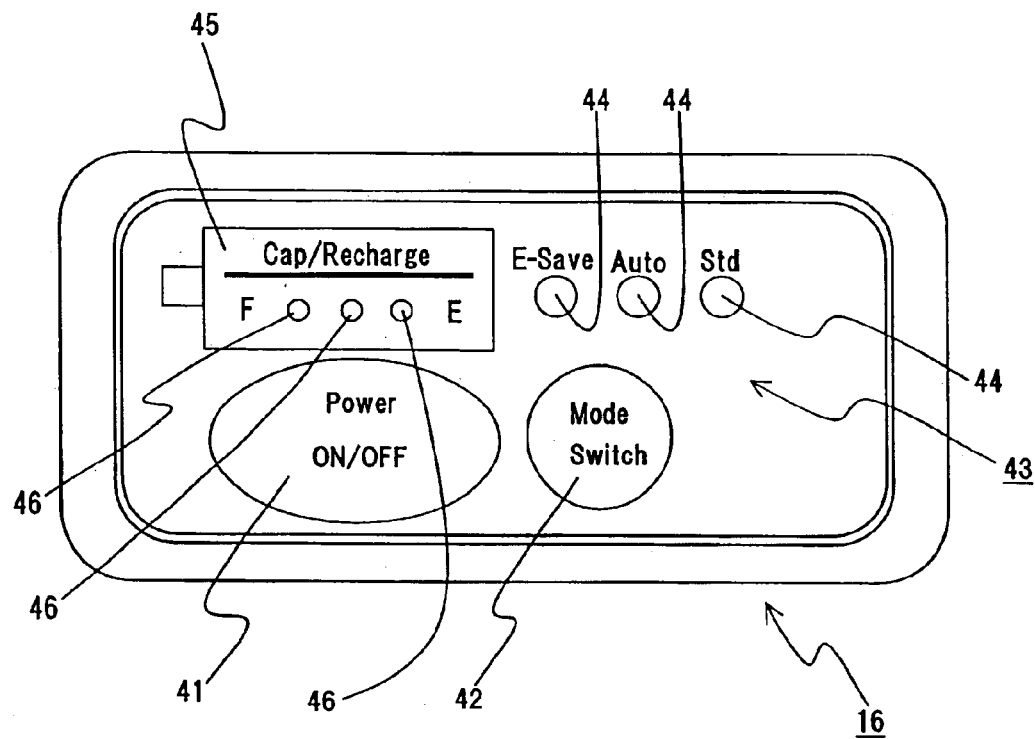
FIG. 5 is a top view of a handle control panel of the electrically assisted bicycle.

Functions and indications of the handle control panel 16 mounted on the handle bar 23 are now described with reference to FIG. 5. In FIG. 5, a first circular operation button 41 situated on the left is a switch for turning power on or off. The first operation button 41 protrudes when not pressed and dents when pressed. When the first operation button 41 is actuated to turn the power on, if a load greater than a predetermined value is applied by human stepping power acted on the pedals, an auxiliary rotational force is generated by the motor 9 to rotate the front wheel 3A and thereby forces the bicycle ahead. When the first operation button 41 is operated to turn the power off, the auxiliary rotational force is not generated and the electrically assisted bicycle is driven only by the human power like the ordinary bicycles.

A second circular operation button 42 situated almost at the center is for setting the degree (mode) of the auxiliary rotational force by the motor 9. More particularly, the second operation button 42 switches the degree of the rotational force sequentially to high, automatic and low by being pressed. The second operation button 42 protrudes when not pressed and dents when pressed. When the second operation button 42 is pressed, a corresponding one of transparent circular indicator windows 44 arranged in a mode display 43 lights up to indicate which mode is selected. A red LED is disposed in each of the circular indicator windows 44. The circular indicator windows 44 indicate, from left to right in the figure, an energy-saving mode (the degree of the rotational force is low), an automatic mode (an assist ratio is small when a step torque by the driver is small and the assist ratio is large when the step torque by the driver is large) and a standard mode (the degree of the rotational force is high).

A battery/regenerative recharge indicator 45 situated in an upper part of the handle control panel 16 indicates the remaining capacity of the battery 10 or the state of regenerative recharge. The indicator 45 indicates the remaining capacity of the battery 10 when the rear brake lever 17B is not operated and the regenerative switch 18 is off. The remaining capacity of the battery 10 is computed by the control circuit 15 from the detected voltage of the battery 10, the integral of consumed power and the like. The indicator 45 includes three transparent circular indicator windows 46. One of the indicator windows 46 corresponding to the remaining capacity of the battery 10 lights up to indicate how much the remaining capacity is. Red LEDs are disposed in the indicator windows 46. The indicator windows 46 are lit up by lighting the red LEDs.

When the rear brake lever 17 is operated and the motor 9 regeneratively brakes and functions as a power generator to recharge the battery 10, the three indicator windows 46 repeat lighting and extinguishing sequentially from left to right. Thereby, the driver can visually recognize that the motor is regeneratively braked and the battery 10 is being recharged.

The control circuit 15 is so constituted to shut off the current from the battery 10 to protect the circuit components when it receives from the temperature sensor 19 a signal indicating an abnormal overheating of the circuit components with respect to a predetermined temperature. Further the control circuit 15 controls the current supplied to the motor 9 under signals inputted from the current sensor 20 and the voltage sensor 21. At this time, the control circuit 15 computes the remaining capacity of the battery 10 from the voltage of the battery 10 and the integral of consumed power as described above and controls a discharge current so that the battery 10 does not over-discharge.

Now, a function of a water immersion sensor 22 shown in FIG. 4 is described briefly but not in detail. A slip ring is adopted for transmitting an electric output from the rotating crank torque sensor 13 to the control circuit 15, as described later. The slip ring, if it gets wet, does not transmit the electric output properly. For this reason, the water immersion sensor 22 is used for detecting whether the slip ring is wet. When the water immersion sensor detects that the slip ring is wet, the driving of the motor 9 is stopped because the motor 9 is not driven normally based on the stepping force.

Figure 6:
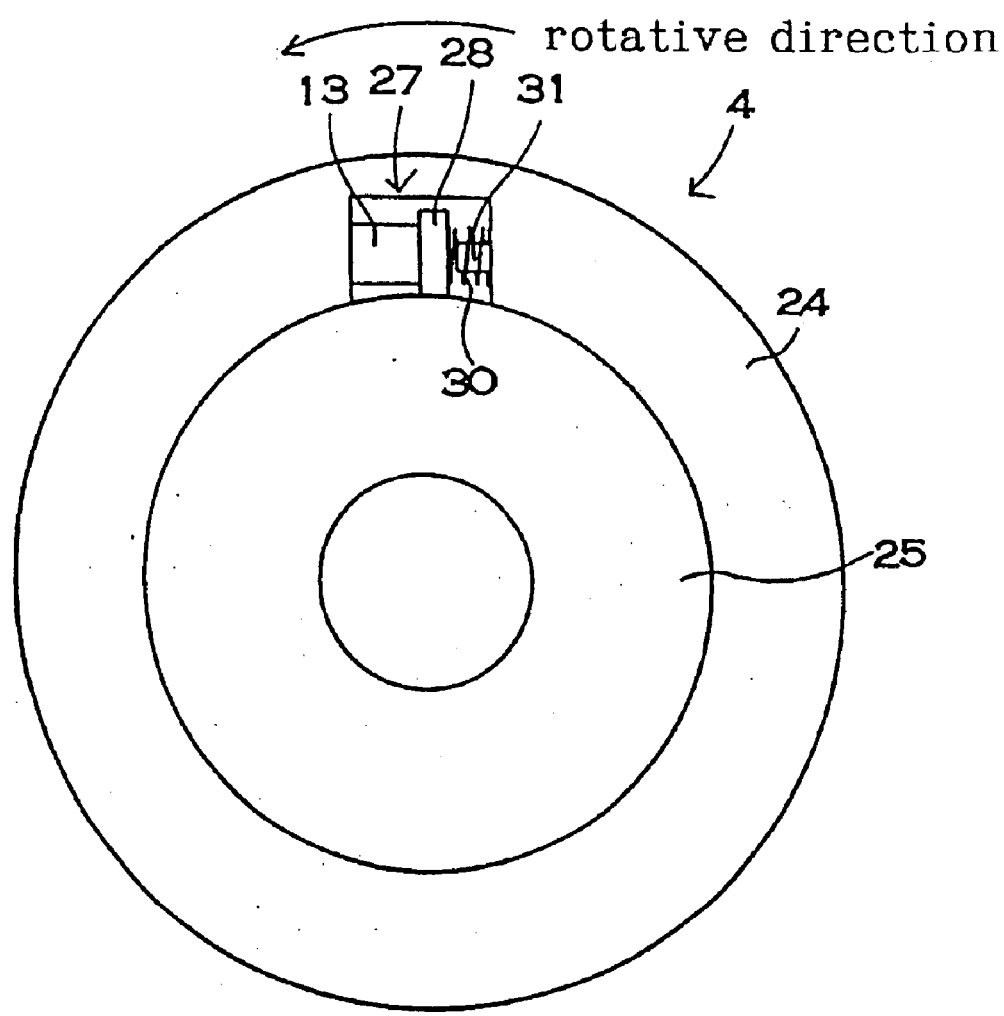
FIG. 6 is a schematic view of a first sprocket of the electrically assisted bicycle.
Figure 7:
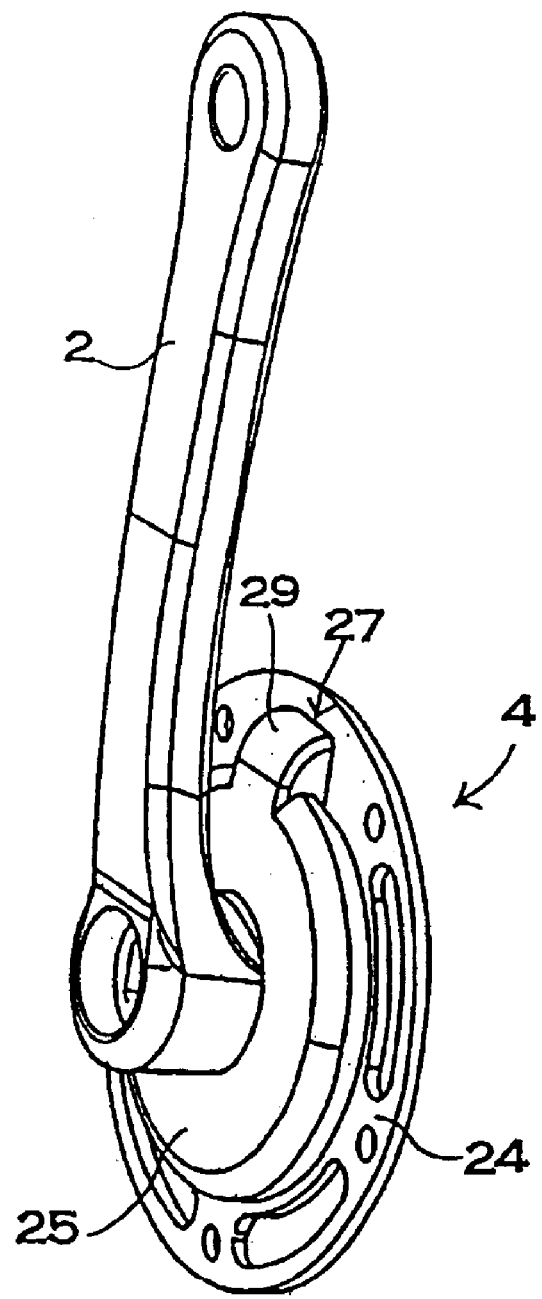
FIG. 7 is a perspective view of the first sprocket.
Figure 8:
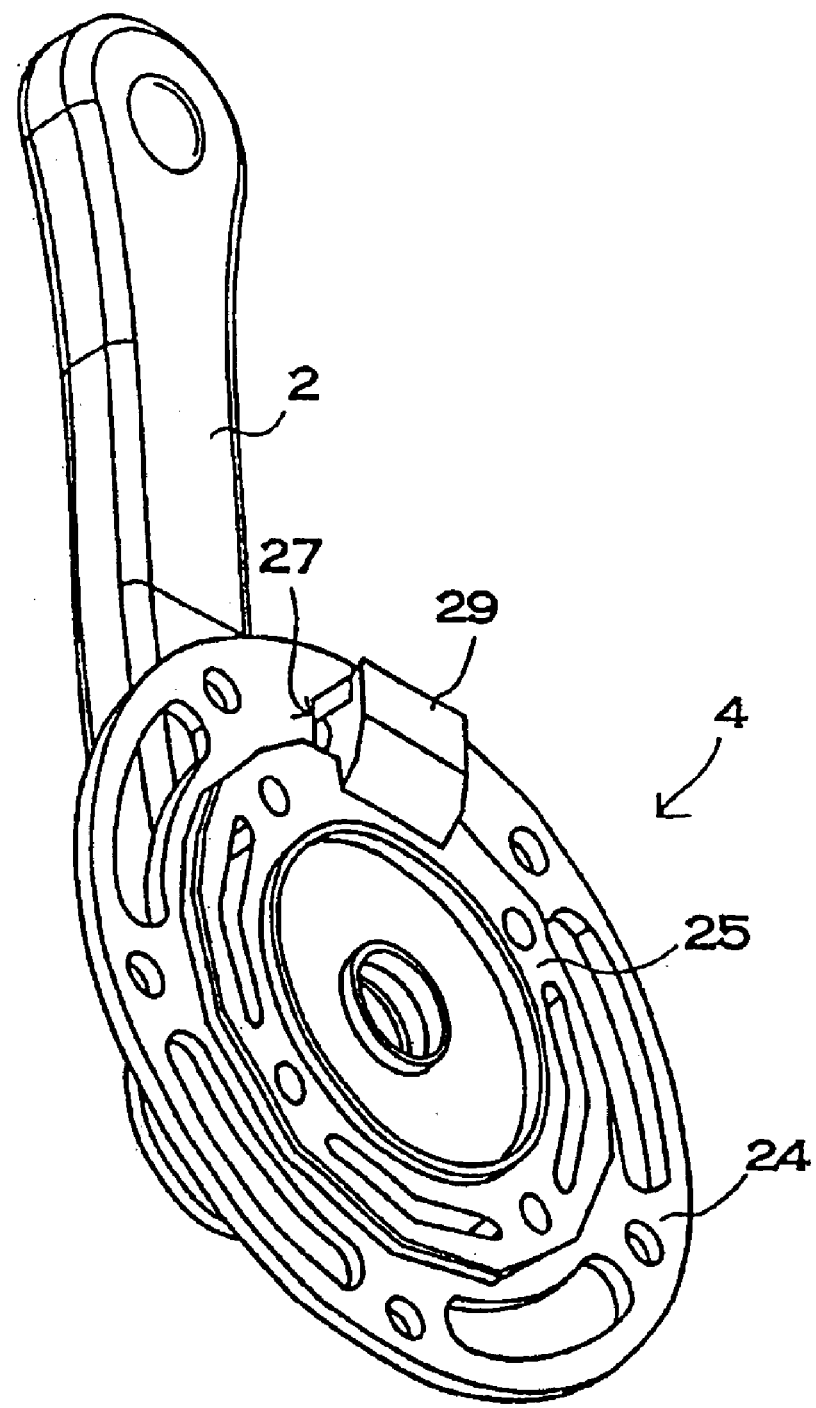
FIG. 8 is a perspective view from a rear side of the first sprocket.
Figure 9:
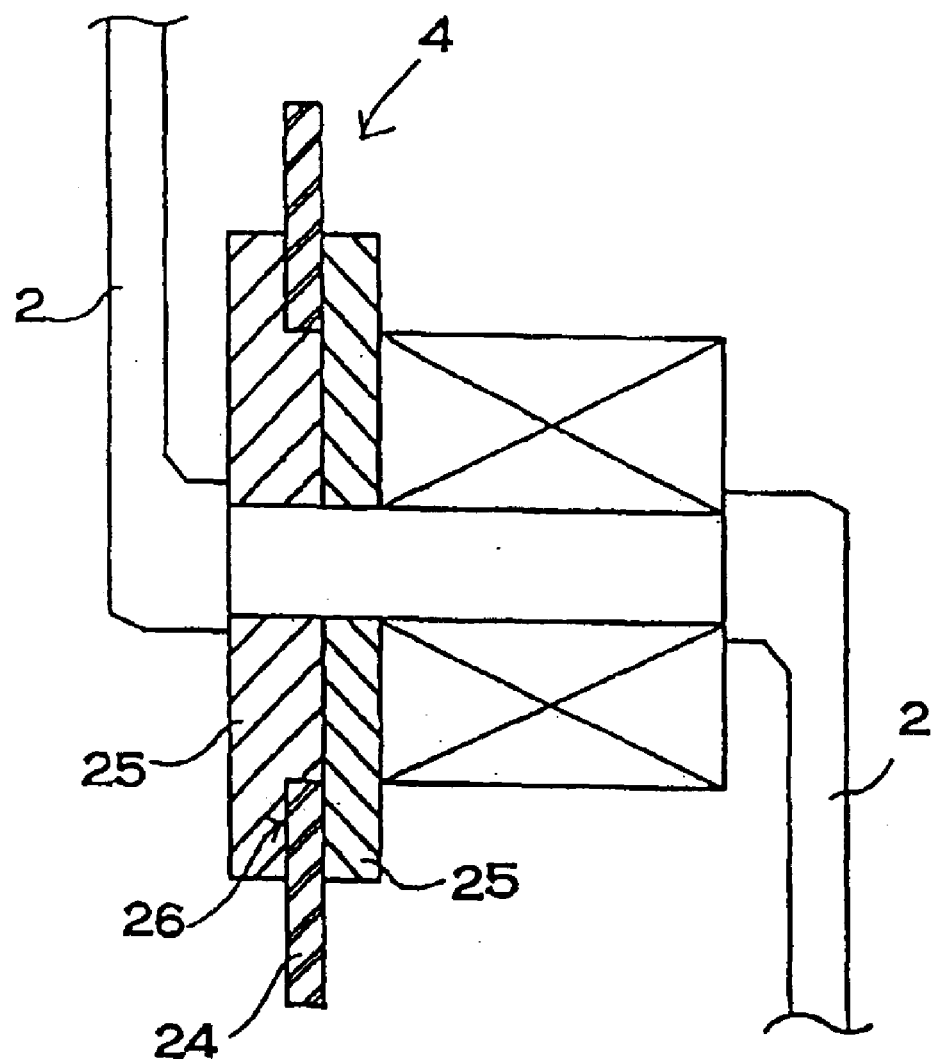
FIG. 9 is a schematic sectional view of the first sprocket.

The crank torque sensor 13 is contained in the first sprocket 4 rotated by the pedal crank 2. FIG. 6 is a schematic view of the first sprocket 4 containing the crank torque sensor 13. FIGS. 7 and 8 are perspective views of this first sprocket 4. The first sprocket 4 includes an outer ring 24 provided separately with teeth (not shown) on its outside periphery for engagement with the chain 6 and an inner ring 25 which is inside the outer ring 24 and is rotated by the pedal crank 2. The inner ring 25 is coupled to the outer ring 24 so that it can rotate within a predetermined angle with respect to the outer ring 24. As shown in the sectional view of FIG. 9, the inner ring 25 is provided with a peripheral groove 26 for guiding the outer ring 24 rotatably. The inside periphery of the outer ring 24 is fitted to the peripheral groove 26 so that the outer ring 24 can rotate but does not disengage in an axial direction. The outer ring 24 is provided with a recess on its inside periphery for accepting the crank torque sensor 13. The inner ring 25 has a drive arm 28 projecting into the recess 27 of the outer ring 24. The crank torque sensor 13 is mounted between the drive arm 28 and the recess 27. The inner ring 25 is provided with a cylindrical member 29, which contains therein the crank torque sensor 13 as shown in FIGS. 7 and 8. The crank torque sensor 13 as described above is mounted inside the cylindrical member 29. Further, the cylindrical member 29 also contains therein a coil spring 30 as a pressing spring on a side of the drive arm 28 opposite to a side abutting to the crank torque sensor 13. The coil spring 30 presses the drive arm 28 against the crank torque sensor 13 at a constant pressure. The outer ring 24 has a projection 31 which projects into the recess 27 and is inserted in the coil spring 30. The coil spring 30 is arranged in place by being put on the projection 31 of the outer ring 24 and is inserted in the cylindrical member 29. In the first sprocket 4, when the pedal crank 2 rotates the inner ring 25, the drive arm 28 of the inner ring 25 rotates the outer ring 24 via the crank torque sensor 13. The rotational force of the pedal crank 2 rotates the outer ring 24 via the crank torque sensor 13, and the outer ring 24 in turn rotates the rear wheel 3B via the chain 6. When the pedals 11 receive a stronger stepping force, the inner ring 24 presses the crank torque sensor 13 at a stronger pressure. Therefore, the crank torque sensor 13 detects the pressure acted thereon and detects the running torque of the pedal crank 2. The crank torque sensor 13 shown in the FIG. 6 is a pressure sensor using a magnetostrictor, and the electric output from the crank torque sensor 13 is detected by the control circuit 15 using the slip ring for obtaining the electric output from the crank torque sensor 13, though detailed explanation is omitted.

Figure 10:
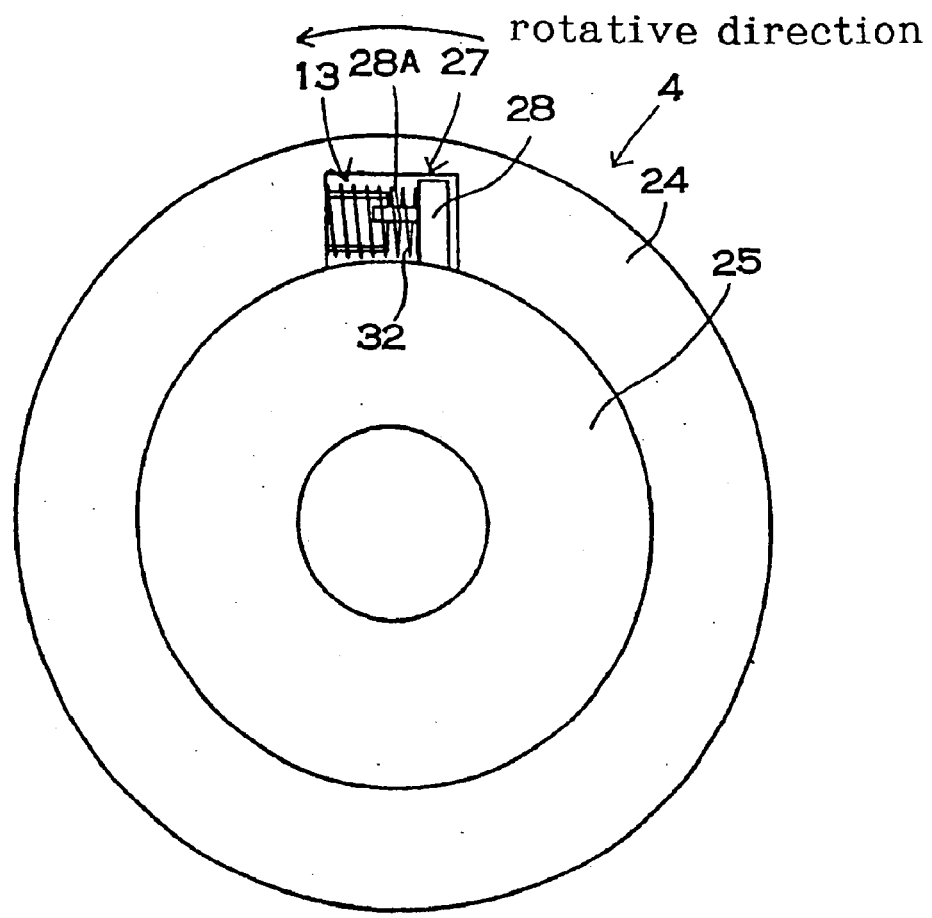
FIG. 10 is a schematic view of another example of a crank torque sensor.

However, the crank torque sensor 13 in the invention is not limited to a pressure sensor. A displacement sensor is also used as the crank torque sensor 13. FIG. 10 illustrates another example using a displacement sensor as the crank torque sensor. In the first sprocket 4 of this figure, a projection 28A is mounted on the drive arm 28 of the inner ring 25, and the displacement sensor detects displacement of the projection 28A. A coil spring 32 as a pressing spring is provided between the drive arm 28 of the inner ring 25 and the recess 27 of the outer ring 24. The coil spring 32 becomes shorter by compression as the inner ring 25 is driven by a stronger stepping force. When the coil spring 32 is compressed, the projection 28A of the drive arm 28 of the inner ring 25 approaches the displacement sensor or is pressed into the displacement sensor. The displacement sensor detects a position to which the projection 28A has moved in order to determine the torque of the pedal crank 2.

Next, an explanation is given of a switching mechanism of the regenerative braking which characterizes the present invention. The regenerative switch 18 is a switch that detects the operation of the rear brake lever 17B and is mounted along the rear brake cable 57, which is pulled by the brake lever 17 (see FIG. 1B). The regenerative switch 18 may be in the rear brake lever 17B.

Figure 11:
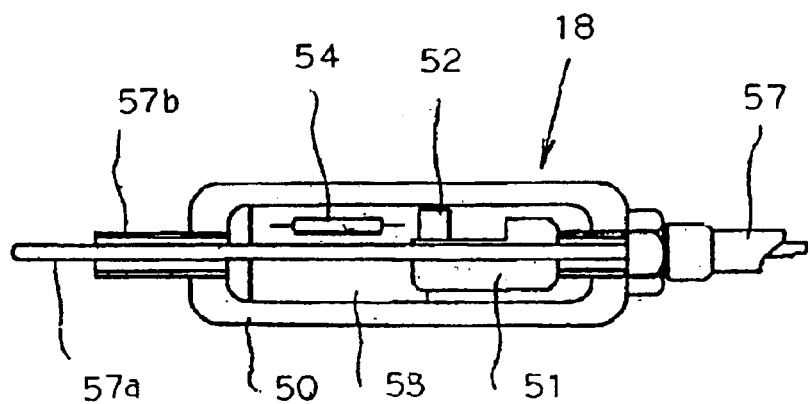
FIG. 11 is a sectional view of a switch case of a regenerative switch of the electrically assisting bicycle, showing its OFF state.
Figure 12:
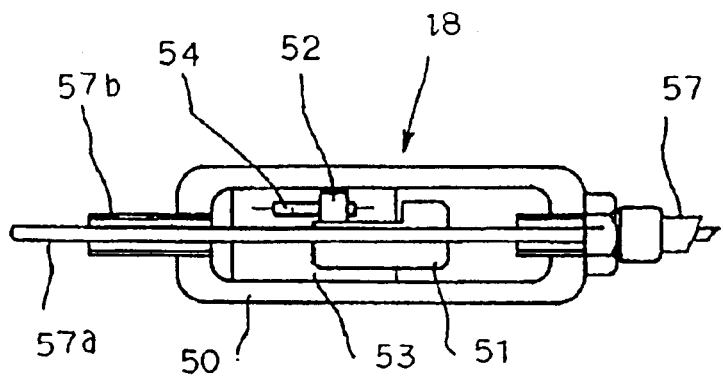
FIG. 12 is a sectional view of a switch case of the regenerative switch of the electrically assisting bicycle, showing its ON state.

An example in which the regenerative switch 18 is mounted along the rear brake cable 57 with reference to FIGS. 11 and 12. As shown in the figures, the regenerative switch 18 includes a box-shaped switch case 50 mounted along the length of the rear brake cable 57, a sleeve 51 mounted on the inner cable 57a of the rear brake cable 57 within the switch case 50, a magnet 52 mounted on an upper face of the sleeve 51 and a reed switch 54 mounted on a circuit board 53 (a wiring diagram not shown) in the switch case 50 oppositely to the magnet 52. The reference numeral 57b denotes an outer tube of the rear brake cable 57.

The reed switch 54 is off when the magnet 52 is in a state as shown in FIG. 11 (the rear brake lever 17B is not operated) and the reed switch 54 is switched on from this state when the reed switch 54 moves to the left by movement of the inner cable 57a, as shown in FIG. 12. The switch case 50 is almost box-shaped and has a hermetic structure, though that is not shown in the figures.

The operation of this switching mechanism at driving the bicycle is now described. When the bicycle is driven by pumping the pedals 11, the torque sensor 13 detects human power and the motor 9 auxiliarily drives the front wheel 3A. At this time, the reed switch 54 and the magnet 52 of the regenerative switch 18 is in the state shown in FIG. 11.

In this state, if the rear brake lever 17B is gripped for braking, the inner cable 57a of the rear brake cable 57 is pulled. The magnet 52 is moved to the left with the pull of the inner cable 57a, so that the state changes as shown in FIG. 12 and also the brake shoe 72 slidingly abuts to the brake drum 71 to brake the rear wheel 3B.

When the regenerative switch 18 is turned on by this braking operation, an ON signal is output to the control circuit 15. On receiving input of a signal indicating the braking operation, the controlling circuit 15 uses the motor 9 as a power generator and regeneratively brakes the front wheel 3A to recharge the battery 10. The control circuit 15 recharges the batter 10 by regenerative braking with detecting the remaining capacity of the battery 10 and preventing the over-charging of the battery. More particularly, when the battery 10 is fully recharged, the regenerative braking is stopped in order to stop the recharge of the battery 10 even if the braking operation is made.

The electrically assisted bicycle that detects the braking operation and generatively brakes the front wheel 3A can make smooth braking and effectively recover kinetic energy of the electrically assisted bicycle to recharge the battery 10. Therefore, the bicycle can be stopped smoothly and the battery can provide an increased driving distance.

In this example, the brake cable 57 is adjusted as follows: If the rear brake lever 17B is gripped a little (i.e., the rear brake lever 17B is a little displaced or gripped lightly), the reed switch 54 turns on and the regenerative switch 18 becomes in an ON state to regeneratively brake the front wheel 3A (a first braking state). Further, if the rear brake lever 17B is gripped tightly (i.e., the rear brake lever 17B is displaced greatly), the state of regeneratively braking the front wheel 3A is maintained, and also the inner cable 17a is pulled and the connection member 74 is displaced, so that the above-described extending bar (not shown) is moved to actuate the brake shoe 72 for stopping the rear wheel 3B (a second braking state).

The brake cable 57 can also be adjusted so that braking by the regenerative braking of the motor 9 occurs simultaneously with braking by the braking mechanism acting on the brake shoe 7, as required.

Figure 13:
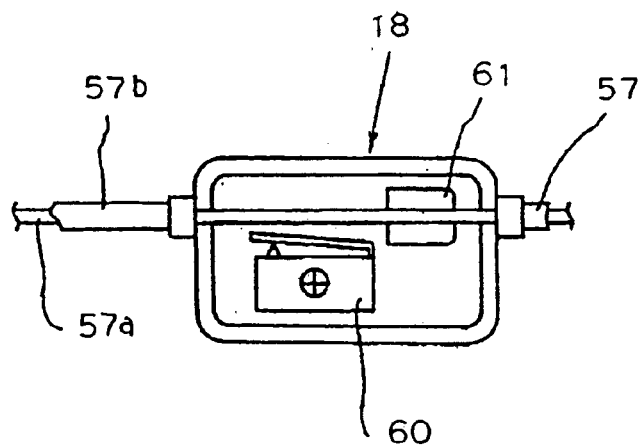
FIG. 13 is a sectional view of a switch case of another regenerative switch of the electrically assisting bicycle, showing its OFF state.
Figure 14:
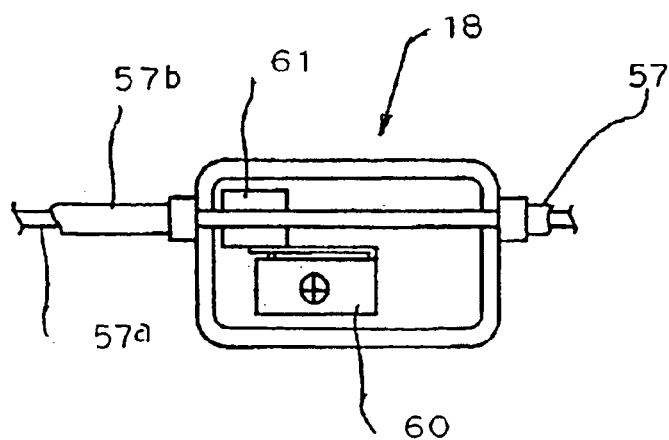
FIG. 14 is a sectional view of a switch case of said another regenerative switch of the electrically assisting bicycle, showing its ON state.

Although the reed switch 54 is used as the regenerative switch 18 in the electrically assisted bicycle as shown in FIGS. 11 and 12, a limit switch 60 may be used instead as shown in FIG. 13 illustrating the OFF state of the switch and FIG. 14 illustrating the ON state of the switch. In both the figures, the reference numeral 61 denotes an actuating piece mounted on the inner cable 57a of the rear brake cable 57.

In the above examples, if the rear brake lever 17B is gradually gripped for braking the rear wheel 3B while the bicycle is running, the regenerative switch 18 first shifts from the state shown in FIG. 11 to the state shown in FIG. 12 to turn into the ON state. Thereby the motor 9 is used as the power generator and the front wheel 3A is regeneratively braked, that is, the first braking state is created. Thereafter, if the rear brake lever 17B is kept gripped, this regenerative braking state can be maintained until the motor 9 drives at a low speed. In the regenerative braking state as the first braking state, the driver on the bicycle can perceive a sense of braking and also keep track of the regenerative braking and recharging state by visually checking the sequential lighting and extinguishing of the indicator windows 46 from left to right on the handle operation panel 16 as described above.

In this state, if the rear brake lever 17B is gripped more tightly, the regenerative switch 18 is maintained in the ON state to keep the regenerative braking and also the inner cable 17a is pulled to displace the connection member 74. Then the extension bar is moved and the brake shoe 72 is actuated to give rise to the second braking state, in which the rear wheel 3B is braked.

According to the present invention, at the braking operation on the rear wheel 3B, the rear wheel 3B is braked. Also the motor 9 of the front wheel 3A is used as the power generator and the front wheel 3A is regeneratively braked. Thus, by the braking operation on the rear wheel 3B, both the rear wheel 3B and the front wheel 3A can be simultaneously braked. Therefore, the present invention enables stable stopping because both the wheels are braked, whereas, in the conventional example as discussed above, the regenerative braking and braking by the braking mechanism act on the rear wheel 3B abruptly. The same effect can be obtained by a construction such that the motor drive mechanism having the motor 9 as a drive source drives the rear wheel 3B instead of the front wheel 3A and the front wheel 3A is braked by the braking operation.

At operating the rear braking 17B, the electrically assisted bicycle of the present invention has the first braking state in which the motor 9 is used as the power generator and the front wheel 3A is regeneratively braked and the second braking state of maintaining this regenerative braking and also braking by the breaking mechanism. In the conventional example as discussed above, the braking by the breaking mechanism and the braking by the regenerative braking act simultaneously. Therefore, the bicycle slows its speed sharply be the braking mechanism. Consequently the conventional example does not provide a sufficient regenerative recharge for a long time. In contrast, in the present invention, because the regenerative braking of the first braking state can be maintained, the kinetic energy of the electrically assisted bicycle during traveling cannot be consumed by braking by the braking mechanism and can be utilized for regenerative braking. Then, through the regenerative braking, the battery 10 can be recharged.

What is claimed is:

1. An electrically assisted bicycle comprising:
   front and rear wheels;
   a human power drive mechanism for transmitting human power from a pedal to the rear wheel;
   a battery-powered motor;
   a motor drive mechanism for auxiliary driving one of the front and rear wheels by the motor, wherein the one wheel constitutes an auxiliary-driven wheel and the other wheel constitutes a non-auxiliary driven wheel;
   a brake lever operated by a driver;
   a human power brake mechanism operably coupled to the brake lever for braking the non-auxiliary driven wheel by human power transmitted from the brake lever; and
   a motor control circuit operably connected to the brake lever for controlling the motor so that the motor is regeneratively braked to act as a power generator, wherein the auxiliary driven wheel is regeneratively braked by the motor and the non-auxiliary driven wheel is not braked by the human power brake mechanism when a displacement amount of the brake lever is less than or equal to a predetermined amount, and wherein the auxiliary driven wheel is regeneratively braked by the motor and the non-auxiliary driven wheel is braked by the human power brake mechanism when the displacement amount of the brake lever is greater than the predetermined amount.

2. The electrically assisted bicycle according to claim 1 wherein the front wheel constitutes the auxiliary driven wheel.

3. The electrically assisted bicycle according to claim 1 further comprising a display device for indicating a remaining battery capacity when the brake lever is not operated.

4. The electrically assisted bicycle according to claim 1 further comprising an operation section for switching the auxiliary driven power supplied by the motor between high power and low power.

5. The electrically assisted bicycle according to claim 1 further comprising a display section for indicating when the auxiliary driven wheel is being regeneratively braked.

* * * * *